(12) United States Patent
Cadotte et al.

(10) Patent No.: US 7,011,173 B2
(45) Date of Patent: Mar. 14, 2006

(54) REAR FAIRING FOR A SNOWMOBILE

(75) Inventors: Germain Cadotte, St-Élie d'Orford (CA); Eric Bertrand, St-Élie d'Orford (CA); Yvon Bédard, Orford (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/723,564

(22) Filed: Nov. 25, 2003

(65) Prior Publication Data

US 2004/0104063 A1  Jun. 3, 2004

Related U.S. Application Data

(60) Provisional application No. 60/428,752, filed on Nov. 25, 2002.

(51) Int. Cl.
*B62M 27/02* (2006.01)

(52) U.S. Cl. ............... 180/190; 224/435; 224/408; 180/182

(58) Field of Classification Search ........... 180/190, 180/182; 114/55.52; 297/195.12; 224/413; 280/847, 152.2, 849, 851, 852, 853

See application file for complete search history.

(56) References Cited

U.S. PATENT DOCUMENTS

| | | | |
|---|---|---|---|
| 4,917,207 A * | 4/1990 | Yasui et al. ............ 180/193 |
| 6,179,182 B1 * | 1/2001 | Hayes .................. 224/408 |
| 6,263,991 B1 * | 7/2001 | Savage et al. ............ 180/190 |
| 6,371,233 B1 * | 4/2002 | Ishii .................... 180/182 |
| 6,729,516 B1 * | 5/2004 | Hanagan ................ 224/423 |
| 6,739,655 B1 * | 5/2004 | Schwochert et al. ... 297/195.12 |
| 6,772,852 B1 * | 8/2004 | Morin et al. ............ 180/182 |
| 2001/0040063 A1 | 11/2001 | Girouard et al. |
| 2001/0040064 A1 | 11/2001 | Girouard et al. |

FOREIGN PATENT DOCUMENTS

| CA | 2293106 | 6/2000 |
|---|---|---|
| CA | 2485813 | 6/2000 |
| JP | 2-299994 A | 12/1990 |

OTHER PUBLICATIONS

SKI-DOO, Parts Catalog-Safari LCE, GLX, 1990, Bombardier Inc., Canada.

SKI-DOO, Historical Catalog, 1999, J. Armand Bombardier Foundation and Bombardier Inc., Canada.

* cited by examiner

*Primary Examiner*—Tony Winner
(74) *Attorney, Agent, or Firm*—Osler, Hoskin & Harcourt LLP

(57) ABSTRACT

A snowmobile is described having a frame, at least one steerable ski disposed at a forward end of the frame, and an endless drive track disposed beneath a rearward end of the frame to propel the frame. A seat is mounted on the frame, which may accommodate at least one person. A fairing is disposed behind the seat, and a storage compartment is defined interiorly to the fairing. Variations are also described.

18 Claims, 13 Drawing Sheets

REAR FAIRING FOR A SNOWMOBILE

This application claims the benefit of priority to U.S. Provisional Patent Application Ser. No. 60/428,752 entitled "REAR FAIRING FOR A SNOWMOBILE" which was filed on Nov. 25, 2002, the contents of which are incorporated herein by reference in their entirety.

BACKGROUND OF THE INVENTION

1. Field of the Invention

The present invention relates generally to snowmobiles. More specifically, the present invention concerns the design and construction of a fairing at the rear of a snowmobile.

2. Description of the Related Art

A conventional snowmobile storage compartment, such as the rear storage compartment on the Bombardier® 2001 Summit® Ski Doo®, is incorporated in the rearward part of the snowmobile's seat. As is common for most conventional snowmobiles, the seat has a rounded rear end that surrounds the storage compartment. A flap extends over a portion of the storage compartment and acts as a closure therefor. The flap, which usually is made of the same flexible material covering the seat (e.g., vinyl), typically includes two elongated holes therethrough. When the flap is closed, it may be secured in place by turning two butterfly bolts, after the bolts have been inserted through the elongated holes.

While the flexible flap is adequate (for the most part) to discourage snow and/or rain from entering the storage compartment and is adequate to prevent items from becoming thrown out of the storage compartment, the flap is not designed to be locked. Accordingly, snowmobile riders typically are required to transport a separate rucksack or carry-all so as not to leave personal belonging in the storage compartment when, for example, a rider stops at a restaurant along a trail to eat a meal. Leaving personal belongings unsecured in the conventional storage compartment is not considered to be prudent.

In addition, the opening into the conventional storage compartment is usually located on the rearward surface of the seat. So that the opening to the storage compartment is large enough to facilitate easy access to the interior thereof, the surface at the rearward face of the seat must be relatively wide. This allows for the widest possible opening into the storage compartment.

In addition, so that the flap covers the largest possible opening into the storage compartment, the rearward face of the conventional snowmobile seat is usually a curved, planar surface that extends the entire width of the seat. The details of this design are illustrated in FIGS. 1 and 2.

One disadvantage to designing a storage compartment as a portion of the seat is that the blunt-ended design does not necessarily take advantage of aerodynamic modeling, which can improve the operation of the snowmobile. Moreover, the average consumer prefers aerodynamic modeling from a visual standpoint.

In addition, despite efforts to provide as large an opening into the storage compartment on a conventional snowmobile as possible, the opening is usually quite small. The small size of the opening places a limit on the size and type of items that may be stored in the storage compartment. Additionally, the size of the opening into the compartment limits the rider's ability to visually inventory the contents of the storage compartment.

In addition, in conventional snowmobiles, the size of the storage compartment is often relatively small, because the seat occupies so large a space on the vehicle. The small size of the storage compartment also limits the convenience associated therewith, because the compartment typically can hold only a small number of items such as a spare set of gloves, an extra sweatshirt or sweater, and other types of similar items.

While the design and construction of conventional snowmobiles has provided a modest amount of storage space and convenience, a demand as arisen for a storage compartment on a snowmobile that is more easily accessed and that can accommodate a larger variety of personal belongings.

As would be appreciated by any snowmobile aficionado, the seat of a snowmobile should be of a respectable dimension to be comfortable to riders. The seat also should provide sufficient space for the incorporation of a storage compartment therein.

On many conventional snowmobiles, a gap exists between the flap over the opening into the storage compartment and the portion of the seat surface that surrounds the opening. This gap is often large enough to permit snow, dirt and other debris to enter the storage compartment. If snow enters the storage compartment and later melts (e.g., because it is a sunny day), the contents of the storage compartment may become wet, which could be a problem if the rider placed additional cold-weather gear (such as a jacket or fleece) into the storage compartment.

Water in the storage compartment also may have a deleterious effect on the material that makes up the core of the seat itself. Often, the seat on a snowmobile is made of a foam material. If water collects in the storage compartment, it may be absorbed by the seat material and degrade that material, which could shorten the useable lifetime of the seat on the snowmobile.

There is also a certain psychological component to a storage compartment that can be maintained in a clean, water-free condition. Even in cases where a snowmobile rider willingly accepts that the contents of the storage compartment are likely to become fouled with water, dirt, and debris, riders of most snowmobiles would prefer vehicles where the contents of the rear storage compartment are not soiled by dirt or snow during operation.

As discussed above, the relatively small opening into the storage compartment on conventional snowmobiles limits the rider's ability to visually inventory the items contained therein. This is true in even under the brightest daylight conditions.

Limited sight access to the interior of the storage compartment is worse in low-light conditions. At twilight (or later in the day), to inventory items stowed in the storage compartment, snowmobile riders must carry with them a small flashlight to illuminate the interior of the compartment. As may be appreciated, conventional snowmobiles do not provide any means to illuminate the interior of the storage compartment.

Prior art snowmobiles also are known that incorporate a luggage rack attached at the rear thereof. While a luggage rack provides additional carrying capacity for a snowmobile, a luggage rack does not offer an enclosed storage compartment.

In addition, it is typical for snowmobiles to be designed to accommodate a second rider behind the driver. In most cases, this is not a difficulty since the conventional storage compartment is positioned rearward of the second rider.

In some cases, it is desirable to modify a snowmobile from a design specifically for a single rider to one that may accommodate a second rider. To accomplish this, manufacturers provide kits that permit the attachment of a second seat to certain snowmobile models. However, with the addition of a second seat, access to the storage compartment in the conventional snowmobile is often cut off or, at least, seriously reduced.

In the case of several snowmobile models, little can be done to add seating for a second rider while maintaining at least a small amount of storage space for personal items.

Each of these deficiencies in the prior art have lead to a demand for an improved construction for the rear storage compartment for a snowmobile.

SUMMARY OF THE INVENTION

It is, therefore, one aspect of the present invention to provide a snowmobile with a storage compartment that is improved over storage compartments known in the prior art.

To accomplish this, one aspect of the present invention provides a frame, at least one ski disposed at the forward end of the frame, an endless track disposed beneath a rearward end of the frame to propel the frame, a seat mounted on the frame adapted to accommodate at least one person and a rearward fairing that functions as a storage compartment.

It is another aspect of the present invention to provide a storage compartment with a top portion pivotally connected to a lower portion, permitting greater access to the interior of the storage compartment.

According to an aspect of this invention, either of the upper or the lower portions comprise a material different from that of the seat. The material of the upper portion being more rigid than that of the seat.

According to another aspect of this invention the upper portion and the lower portion mate with one another in a closed position and do not mate with one another in an opened position, the upper portion pivots to a predetermined angle when in the opened position. In the closed position, the upper portion mated with the lower portion at a junction discouraging ingress of material into the storage compartment and the egress of material from the storage compartment. The junction includes a seal disposed in either one of the upper or the lower portion of the fairing.

It is one aspect of this invention that the fairing lower portion include a tail light. This tail light, when energized, illuminates the interior of the storage compartment.

According to one aspect of this invention the fairing extends a predetermined distance beyond the rearward end of the frame.

It is an aspect of this invention that the fairing comprises a locking system. The locking system can rely on a key for operation.

Another additional aspect of the present invention provides a much more aerodynamic shaped fairing having tapers inwardly from the forward end to the rearward end.

BRIEF DESCRIPTION OF THE DRAWINGS

The invention will further be described, by way of example only, with reference to the accompanying drawings wherein.

DESCRIPTION OF EMBODIMENT(S) OF THE INVENTION

Figure 1:
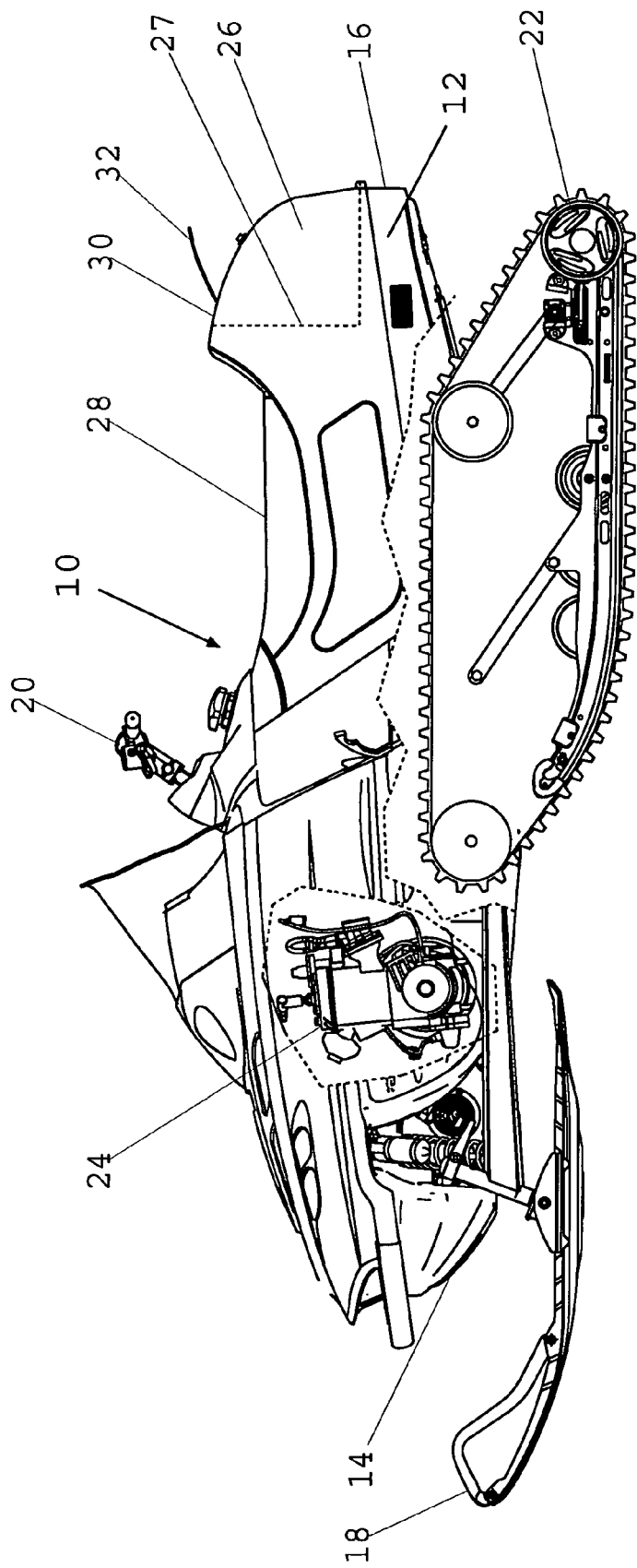
FIG. 1 is a side view of a snowmobile found in the prior art.

FIG. 1 illustrates a side view of a snowmobile 10 of the type generally found in the prior art. The snowmobile 10 includes a frame 12 with a front end 14 and a rear end 16. At the front end 14 of the frame 12, two skis 18 are disposed. The two skis 18 are connected to a handlebar 20 so that the skis 18 may be steered. An endless drive track 22, connected to an engine 24, is disposed beneath the rear end 16 of the frame 12 to propel the snowmobile 10.

As illustrated in FIG. 1, conventional snowmobiles 10 typically include a storage compartment 26 at the rear end 16 above the frame 12. In the usual construction, the seat 28 extends from a location behind the handlebars 20 to the rear end 16 of the frame 12. The storage compartment 26 forms a portion of the rear end 30 of the seat 28.

The seat 28 in the snowmobile 10 is constructed typically of a resilient foam material surrounded by a flexible waterproof covering such as vinyl. To maximize the seating capacity of the snowmobile 10, the inner foam core of the seat 28 typically extends to a location 27 just in front of the storage compartment 26.

As may be appreciated by examining FIG. 1, the distance between the location 27 forming the forward part of the storage compartment 26 and the rear end 16 of the frame 12 provides only limited storage space within the storage compartment 26. This limits the amount of items that may be placed therein. It also limits the size of items that may be stored therein.

So that the entirety of the seat 28 and the storage compartment 26 are supported by the frame 12, the seat 28 continues to the rear end 16 of the frame 12, as illustrated. Essentially, the storage compartment 26 is a hollowed-out portion of the inner foam core of the seat 28.

Figure 2:
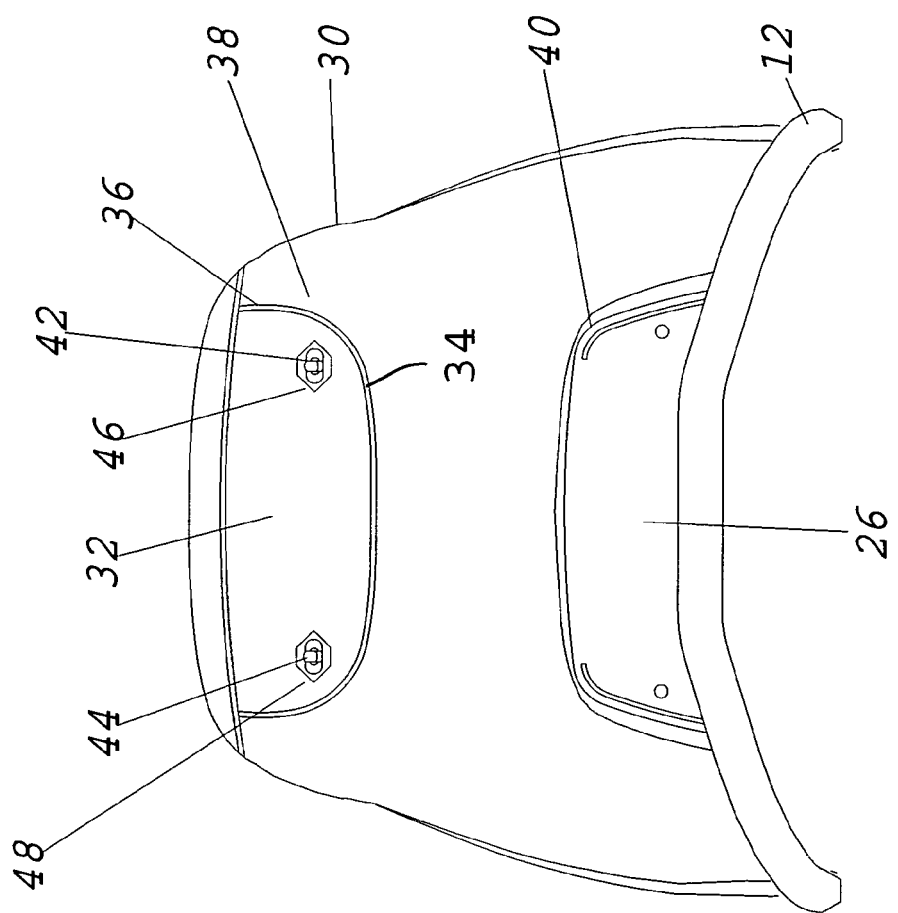
FIG. 2 is an elevation view of the rear of the snowmobile depicted in FIG. 1, illustrating access to the storage compartment therein.

So that the contents of the storage compartment 26 may be secured therein, a flap 32 extends over the opening into the storage compartment 26. As best illustrated in FIG. 2, the flap 32 is a portion of the vinyl cover of the rear end 30 of the seat 28. A U-shaped section 34 is cut into the vinyl covering of the seat 28 to create the flap 32 to provide access to the storage compartment 26 therebeneath. Since the flap 32 is merely an extension of the material covering the seat 28, there is typically a gap 36 formed between the surrounding seat material 38 and the flap 32.

Under certain operating conditions, the gap 36 permits snow, water, and debris to enter the storage compartment 26 even when the flap 32 is secured in a closed position. Accordingly, it is typical for the contents of the storage compartment 26 to become wet and/or soiled if kept in the storage compartment 26 for extended periods of time.

To secure the flap 32 in a closed position, the rear end 30 of the seat 28 includes two rotatable bolts 42, 44. The bolts 42, 44 have elongated top portions that are easily rotated. A corresponding pair of elongated holes 46, 48 are disposed through the flap 32. Once the heads of the bolts 42, 44 pass through the elongated holes 46, 48, they may be turned so that the elongated holes and the bolts 42, 44 are no longer in register. In this manner, the flap 32 may be easily secured.

As may be appreciated, the cooperation between the bolts 42, 44 and the elongated holes 46, 48 provide an adequate closure for the storage compartment 26. However, the storage compartment 26 may not be locked closed to secure the contents of the storage compartment 26.

In addition, since the flap 32 is fashioned from the material covering the seat 28, and since the rear end of the seat 28 presents a relatively narrow profile, the flap 32 is limited in its size. As a result, the dimensions of the flap 32 limit the size of items that may be stored within the storage compartment 26.

Figure 3:
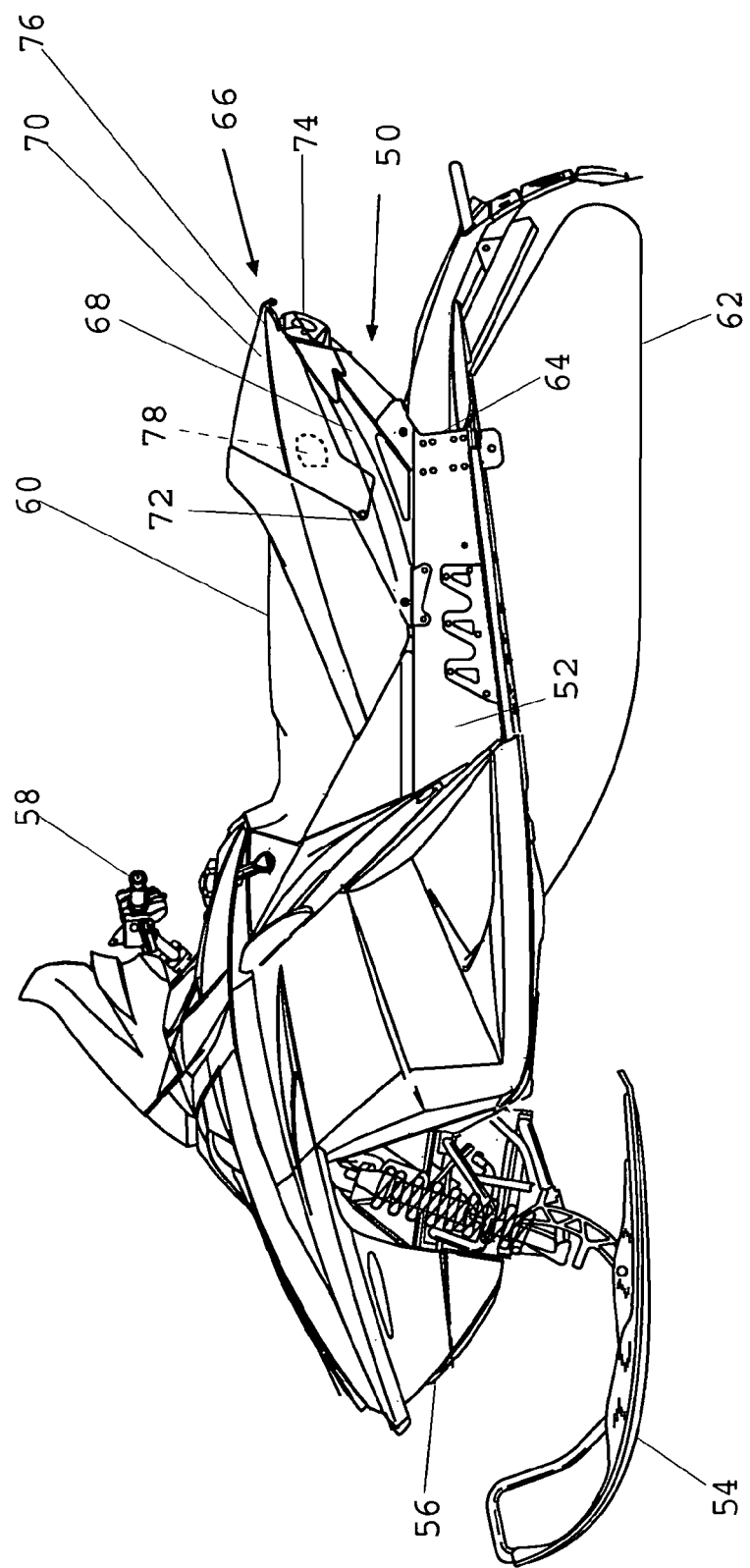
FIG. 3 is a side view of a snowmobile according to the present invention.

FIG. 3 illustrates a side view of one embodiment of the snowmobile 50 of the present invention. The snowmobile 50 has a frame 52 with two steerable skis 54 disposed at a front end 56 thereof. While two skis 54 are standard for most snowmobiles 50, only one is required to steer the vehicle. The skis 54 are steerable, via a handlebar 58, that is positioned at the top of the snowmobile 50 in front of a passenger seat 60.

As illustrated in FIG. 3, an endless drive track 62 is disposed beneath the rear end 64 of the frame 12. Driven by the engine (not shown) at the forward end 16 of the snowmobile 10, the endless drive track 22 propels the snowmobile 10.

The snowmobile 50 of the present invention, shown in FIG. 3, differs from the snowmobile 10 illustrated in FIGS. 1 and 2 in several respects. Among them, the snowmobile 50 includes a rear fairing 66 disposed at the rear end 64 of frame 52 of the snowmobile 50. In one embodiment of the invention, the rear fairing 66 includes a lower portion 68 and an upper portion 70. The upper portion 70 is connected to the lower portion 68 via a pivot 72.

The lower portion 68 is connected to the rear end 64 of the frame 52. In particular, the lower portion 68 is secured to a top surface of the frame 52 at a position immediately rearward of the seat 60. At least a portion of the lower fairing 68 extends a predetermined distance beyond the rear end 64 of the frame 52.

A tail light 74 is incorporated as part of the lower portion 68 of the rear fairing 66. As illustrated in FIG. 3, the tail light 74 is positioned just below the seam 76 that defines the intersection between the lower portion 68 and the upper portion 70 of the rear fairing 66. The tail light 74 is illuminated upon starting the snowmobile 50 and increases brightness upon application of the brakes for the snowmobile 50.

While the tail light 74 is illustrated as an integral part of the lower portion 68 of the rear fairing 66, it is contemplated that the tail light 74 could be manufactured as a separate element, which is then attached to the lower portion 68 of the rear fairing 66. Alternatively, the tail light 74 could be attached to the top portion 70 of the rear fairing, if desired. Other locations for the tail light 74 are also considered to be within the scope of the present invention, as would be appreciated by those skilled in the art.

The upper portion 70 and the lower portion 68 of the rear fairing 66 engage one another along a seam 76. Together, the upper portion 70 and the lower portion 68 of the rear fairing 66 establish a volume that forms the storage compartment 78 for the snowmobile 50.

As would be appreciated by the average snowmobile consumer, snowmobiles 50 are designed to traverse rugged terrain. So that the riders may be comfortable during operation of the snowmobile 50, the seat 60 is designed to provide a maximum of comfort. To do this, the seat 60 is made of a soft, resilient material capable of cushioning the impact of forces encountered as the snowmobile 50 operates. In one example, the seat 60 is made from a foam core material surrounded by a flexible, synthetic material such as vinyl. As would be appreciated by those skilled in the art, however, these particular materials are not required for the construction of the seat 60. Any other suitable materials may be selected for the construction thereof without deviating from the scope and spirit of the invention.

The rear fairing 66, including both the upper portion 70 and the lower portion 68, preferably is constructed from a material more rigid than that from which the seat 60 is made. In particular, in the embodiments illustrated in each of the drawings, the upper portion 70 and the lower portion 68 are made from a rigid plastic. As would be appreciated by those skilled in the art, however, a rigid plastic is not the only material that may be used. Instead, the upper and lower portions 68, 70 could be made from a flexible plastic material, rubber, or a rubber-like material, among others.

In addition, while it is envisioned that the lower portion 68 and the upper portion 70 will be constructed from the same material, those skilled in the art would readily appreciate that this is not required to practice the present invention. To the contrary, since the top portion 70 is immediately adjacent the seat 60, it may be prudent to manufacture the top portion 70 from a more resilient material than the bottom portion 68, just in case a rider inadvertently sits on the top portion 70 during operation of the snowmobile 50.

The location of the rear fairing 66 behind the seat 60 offers a number of advantages. First, the storage compartment 78 may be positioned so that most if not all of the volume thereof extends above and a distance behind the rearward end 64 of the frame 52. As a result, the entirety of the frame 52 may be used to support the seat 60. Moreover, since the rear fairing 66 extends rearwardly of the rear end 64 of the frame 52, the frame 52 does not limit the size of the storage compartment 78. As a result, it is possible to construct a rear fairing 66 with a larger-volume storage compartment 78 than was possible in prior art snowmobiles.

Figure 4:
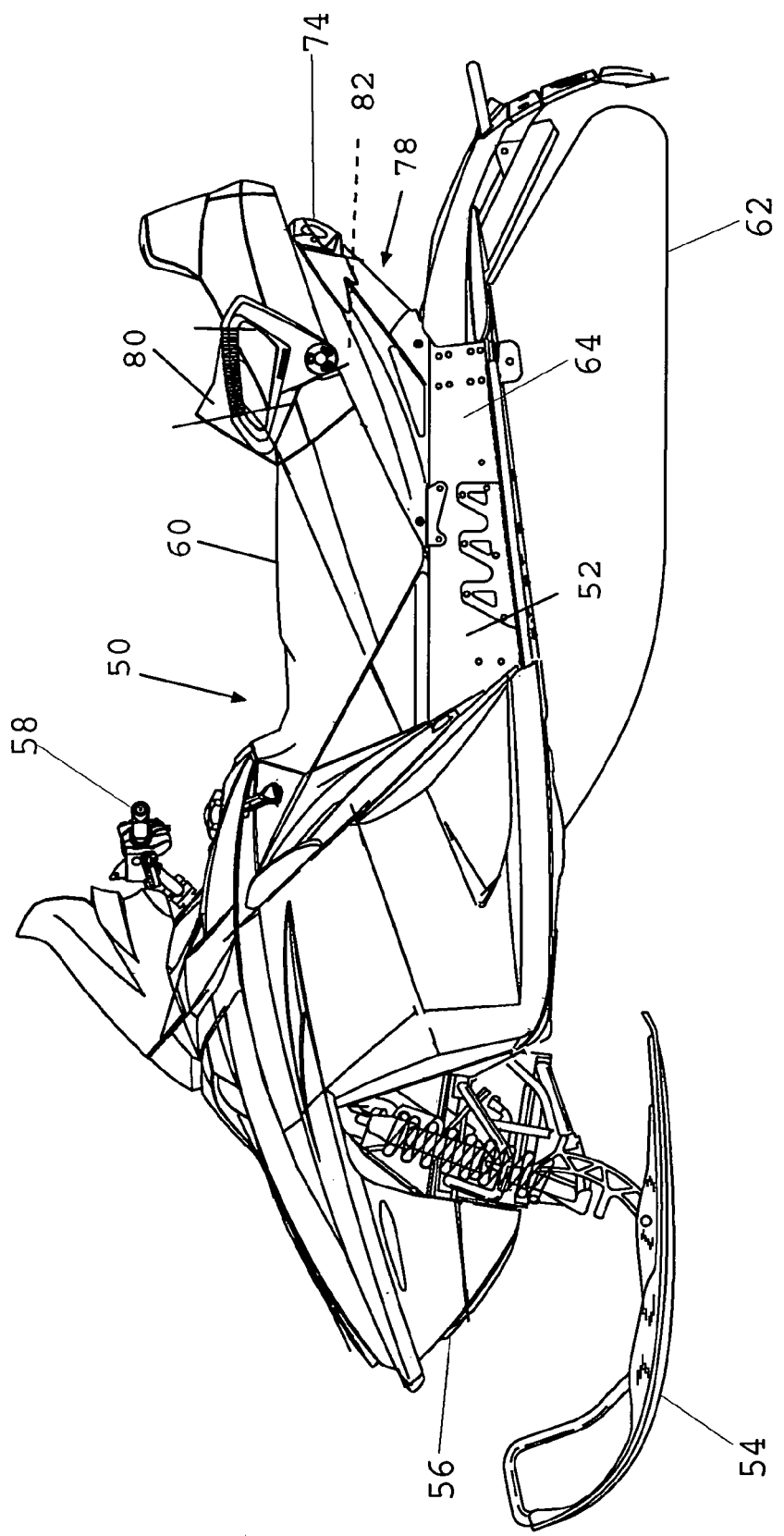
FIG. 4 is a side view of the snowmobile illustrated in FIG. 3 with the addition of a passenger seat at the rear thereof.

FIG. 4 illustrates an alternative construction for the snowmobile 50. In this embodiment, a passenger seat 80 is positioned atop the storage compartment 78. Here, the upper portion 70 of the rear fairing 66 is replaced by the passenger seat 80.

In this embodiment, the lower fairing 68 may be constructed from a rigid material such as aluminum or steel. If so constructed, the lower portion 68 of the rear fairing 66 could be relied upon to bear the weight of the passenger seated on the passenger seat 80.

Alternatively, as illustrated in FIG. 4, a support frame 82 may be affixed to the frame 52 to provide support for the weight of a person seated on the passenger seat 80. As illustrated, the support frame 82 is positioned interiorly to the lower portion 68 of the rear fairing 66 so that the support frame 82 is concealed from view. The passenger seat 80 preferably attaches to the frame 82 in a releasable manner so that the passenger seat may be removed to expose the interior of the storage compartment 78.

While the seat frame 82 will occupy a portion of the volume of the storage compartment 78, a majority of the storage compartment 78 will remain accessible to the rider so that items may be stored therein. Instead of removing the upper portion 70 of the rear fairing 66, the rider merely removes the releasable seat 80 to access the interior of the storage compartment 78. As a result, the addition of a passenger seat 80 does not significantly limit the storage capacity of the storage compartment 78.

Figure 5:
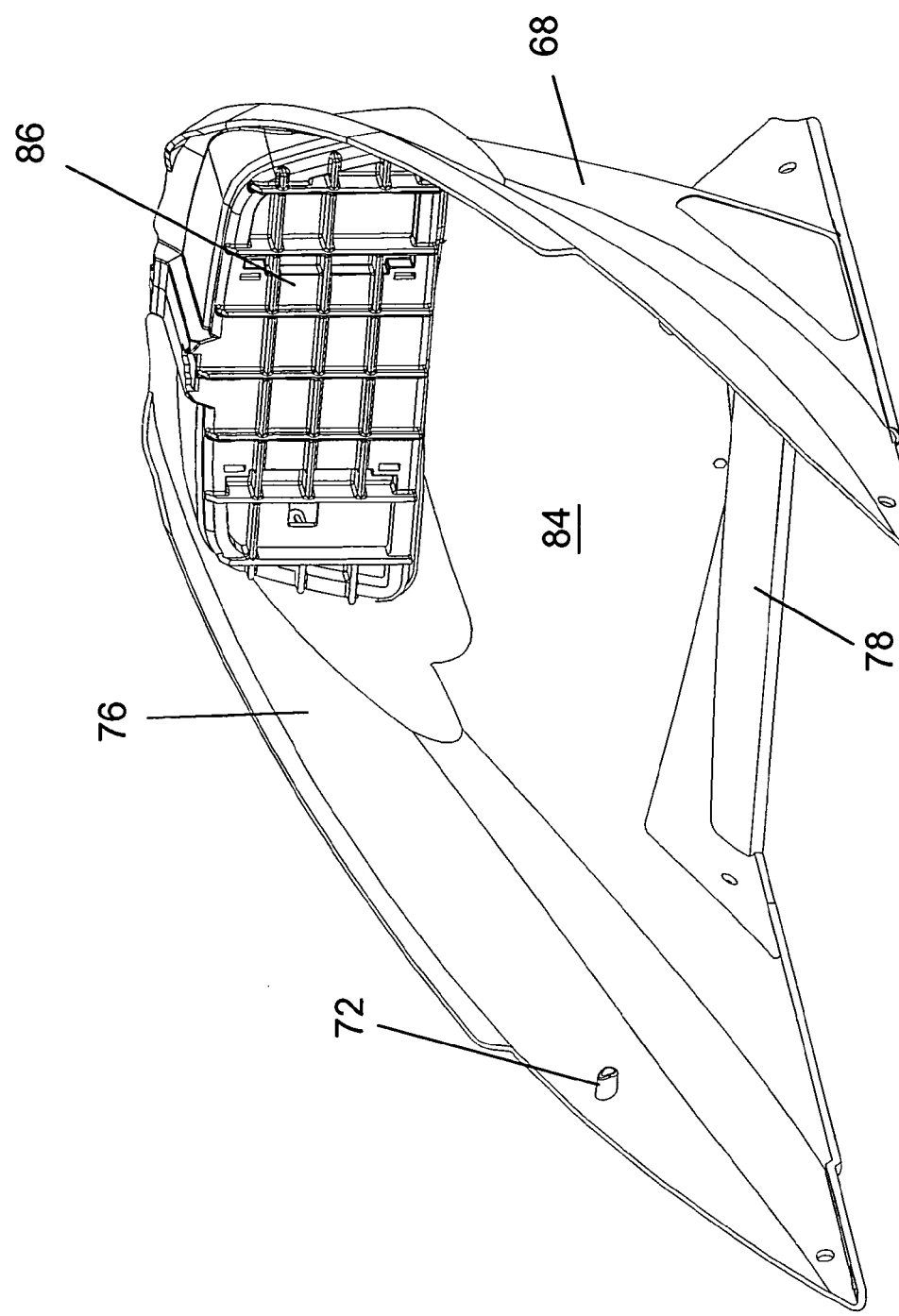
FIG. 5 is a perspective illustration, from the front and left side, of the lower portion of a rear fairing for the snowmobile illustrated in FIG. 3, showing an interior space that functions as a storage compartment.

FIG. 5 is a perspective view of the lower portion 68 of the rear fairing 66, illustrating at least a portion of the interior volume of the storage compartment 78. At the rear end 84 of the lower portion 68 is a vertical surface 86. The vertical surface 86 is the surface to which the tail light 74 is attached.

Figure 6:
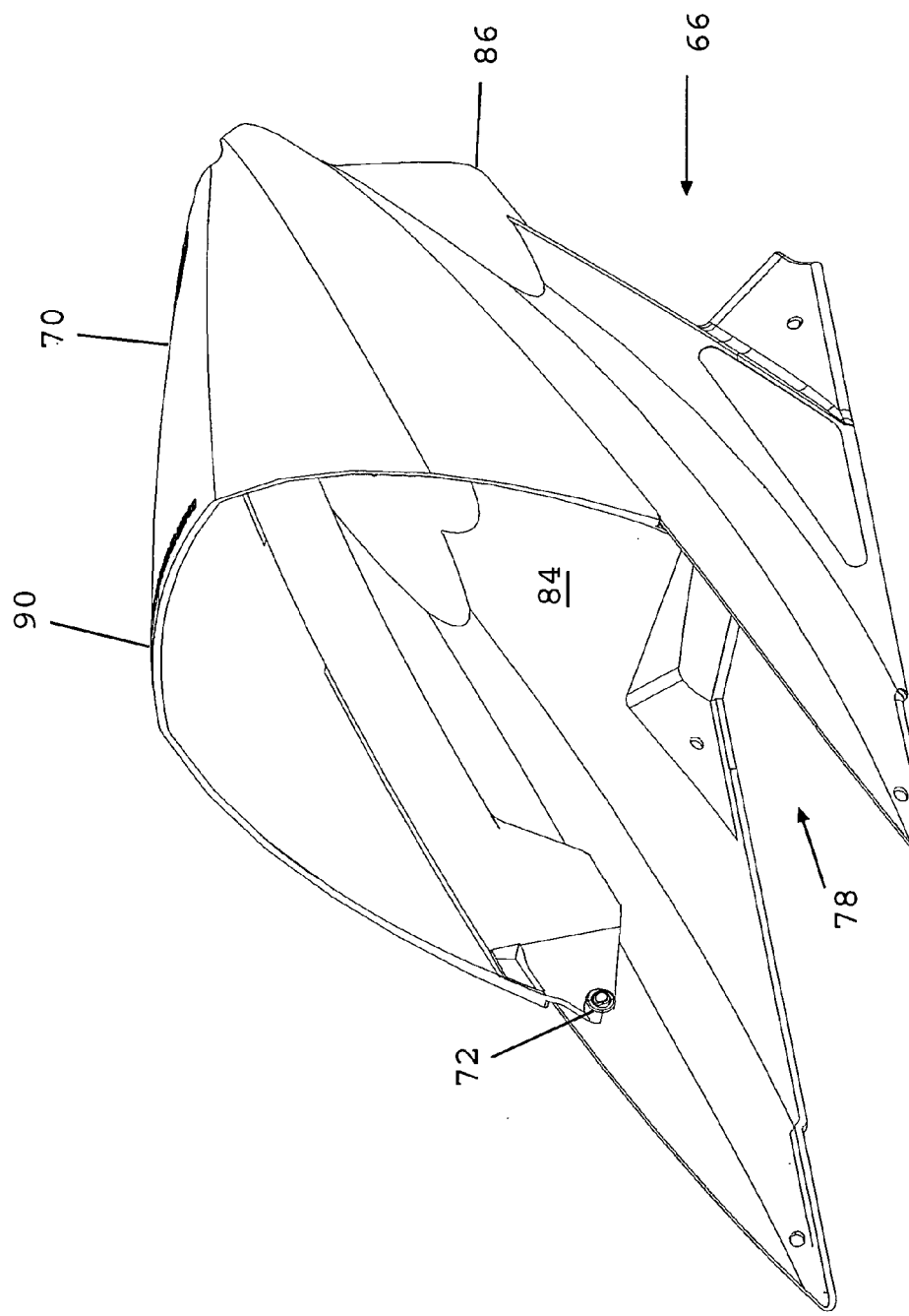
FIG. 6 is a perspective illustration of the rear fairing for the snowmobile illustrated in FIG. 3, showing both the upper and lower portions thereof.

FIG. 6 is a perspective illustration of the lower and upper portions 68, 70 of the rear fairing 66. As illustrated, the upper portion 70 mates with the lower portion 68 along the seam 76. The upper portion 70 moves with respect to the lower portion 68 around the pivot 72. The combination of the lower and upper portions 68, 70 define the volume of the storage compartment 78.

As shown in FIG. 6, the upper portion 70 has a curved upper surface 90. The curved upper surface increases the interior volume of the storage compartment 76. While it is contemplated that the upper portion 70 of the rear fairing 66 will include a curved upper surface 90, such a construction is not required to practice the present invention. If desired, the upper portion 70 could be flat and extend substantially across the top of the rear fairing 66 from one lateral edge of the seam 76 to the other. As would be appreciated, a flat upper portion 70 will diminish the volume of the storage compartment. It is contemplated that the shape of the upper portion 70 of the rear fairing may have any of a number of different degrees of curvature. In fact, it is contemplated that the curved surface 90 of the upper portion may have an even greater degree of curvature than the embodiment illustrated. If provided with a curved surface 90 with a greater degree of curvature, the storage compartment 78 could be provide with an even greater storage capacity.

The present invention also contemplates that the upper portion 70 of the rear fairing 66 may be replaceable to alter the capacity of the storage compartment 78. Depending upon the needs and wants of the rider, the upper portion 70 could be removed, by detaching it from the pivots 72. An alternative upper portion 70, possibly with a very large degree of curvature, could then be substituted for the upper portion 70 that was removed. In this manner, the storage capacity of the storage compartment 78 could be modified by the rider depending on his or her personal needs for a particular snowmobiling excursion.

Figure 7:
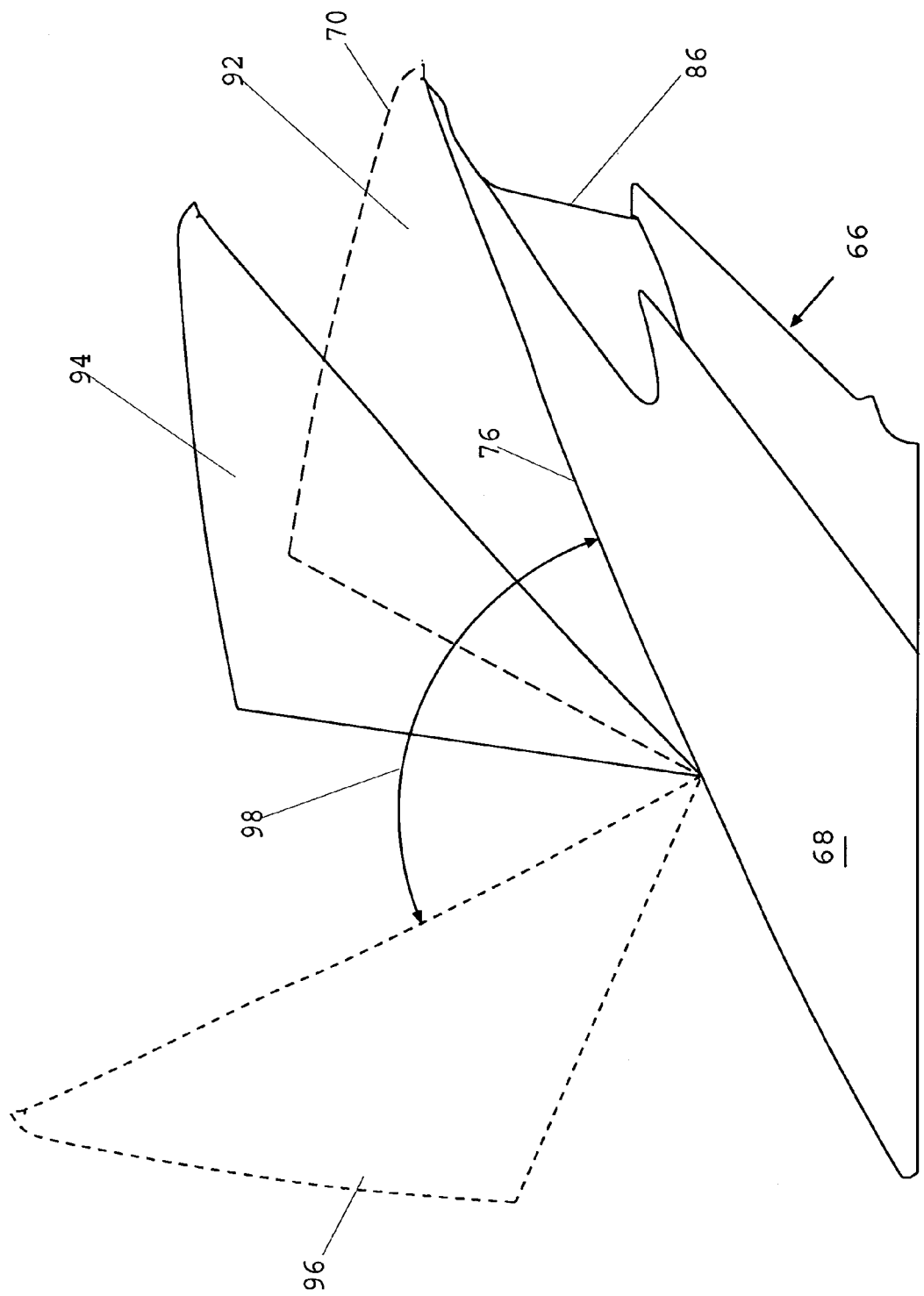
FIG. 7 is a side view illustration of the rear fairing for the snowmobile illustrated in FIG. 3, showing alternative positions of the upper portion of the rear fairing.

FIG. 7 is a side view illustration of the rear fairing 66, showing first, second, and third positions 92, 94, 96 of the upper portion 70. In the first position 92, the upper portion mates with the lower portion 68 of the rear fairing 66 along the seam 76. The second position 94 is a partially opened position. The third position 96 is a fully-opened position. As illustrated, the upper portion 70 rotates about the pivot 72. From the first position 92 to the third position 96, the upper portion defines an angle 98 of from 0 to 150 degrees, 150 degrees representing a maximum position of the upper portion in the third position.

Figure 8:
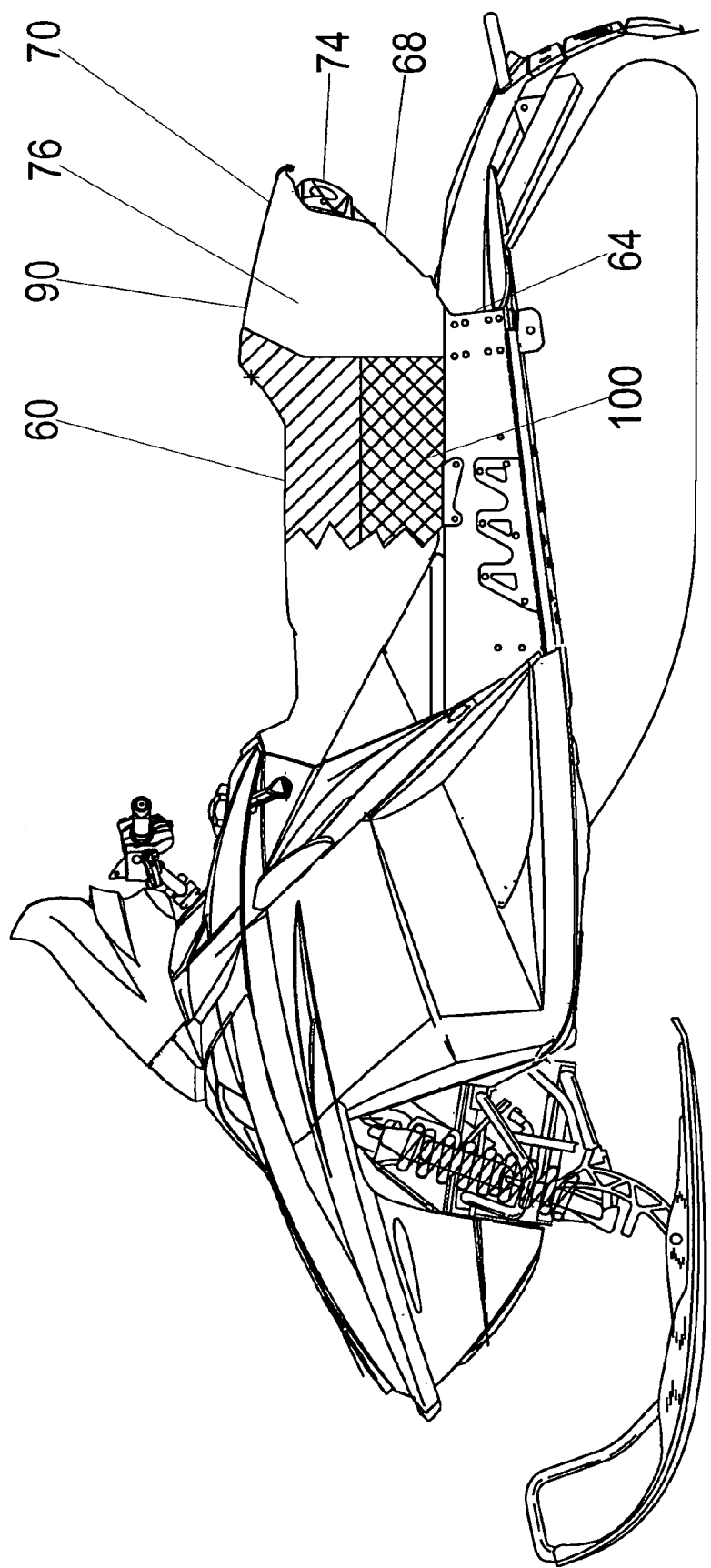
FIG. 8 is a side view of a portion of the snowmobile illustrated in FIG. 3, illustrating the interior storage compartment within the rear fairing.

FIG. 8 is a partial, longitudinal, cross-sectional view of the snowmobile 50 of the present invention, providing a detail of the interior of the storage compartment 76. In particular, the cross-section reveals a portion of the interior of the seat 60 and a portion of the gas tank 100, which is disposed below the seat. As illustrated, the lower and upper portion 68, 70 of the rear fairing define a sizeable storage compartment 78.

Figure 9:
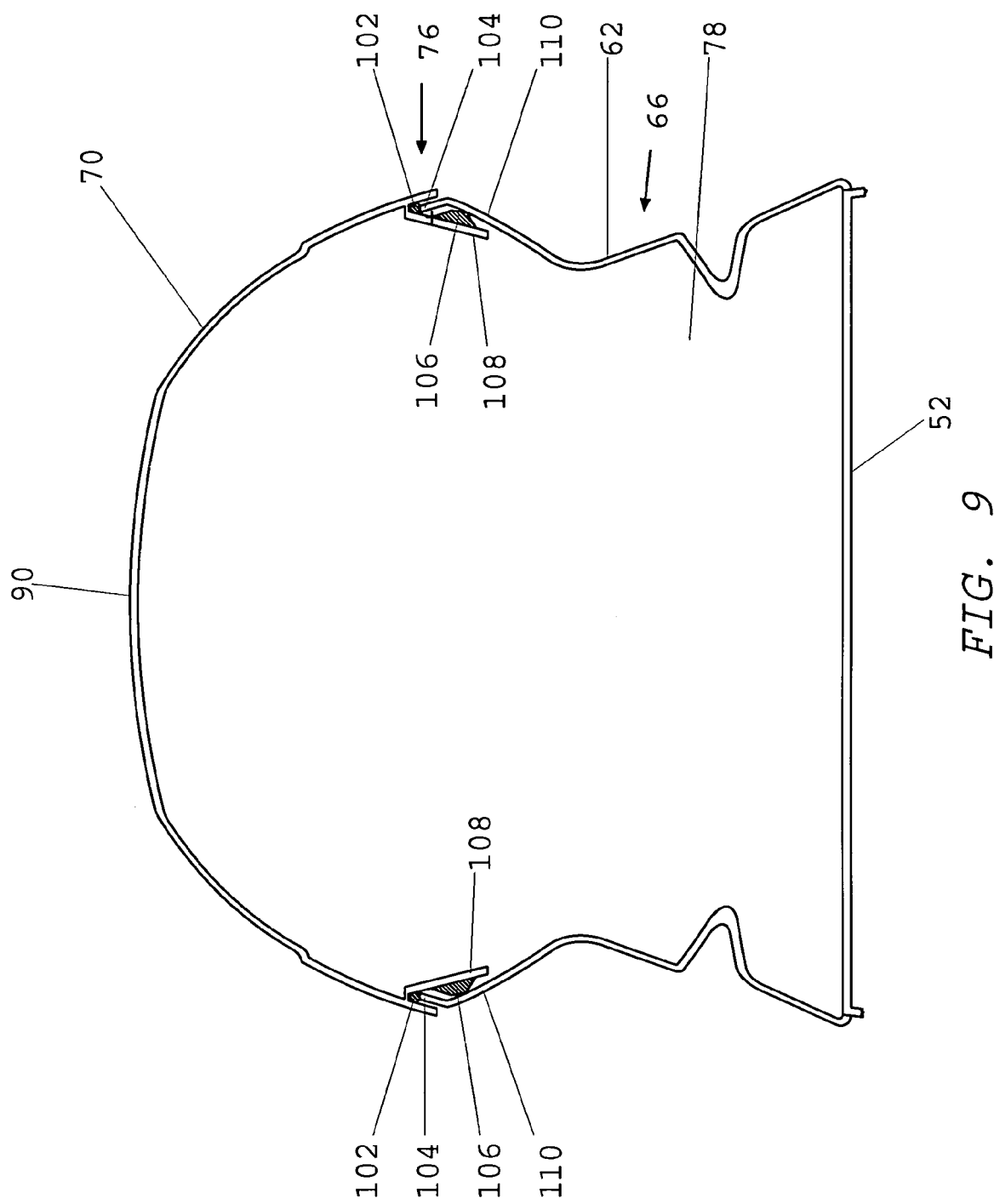
FIG. 9 is a cross-sectional view of the rear fairing of the snowmobile illustrated in FIG. 3, showing the construction of a seal between the upper and lower portions thereof.

FIG. 9 is a lateral, cross-sectional view of the storage compartment 78. As discussed above, the lower portion 68 of the rear fairing 66 is disposed atop the frame 52. The upper portion 70 of the rear fairing 66 engages the lower portion 68 along the seam 76.

To discourage the ingress of snow, water, dirt, and debris into the storage compartment 78, the seam 76 between the lower and upper portions 68, 70 of the rear fairing 66 is provided with at least one sealing element 102. FIG. 9 illustrates the position of this sealing element 102. In particular, the sealing element 102 is connected to the lower portion 68 at an upper lip or edge 104 thereof. To further discourage the ingress of snow, water, dirt, and debris into the storage compartment 78, a second sealing element 106 is provided between the lower and upper portions 68, 70 of the rear fairing 66. The second sealing member 106 is connected to a lower lip 108 of the upper portion 70 and engages an inner surface of the lower portion 68.

As would be appreciated by those skilled in the art, the sealing members 102, 106 extend about the periphery of the seam 76 from one side of the rear fairing 66 to the other to assure a continuous seal. Also, while the first sealing member 102 is described as being attached to the lower portion 68, it is contemplated that the first sealing member 102 could be connected to the upper portion 70. Similarly, the second sealing member 106 could be attached to the lower portion 68 rather than the upper portion 70. In still further possible embodiments, both seals could be attached to either the lower or upper portions 68, 70, depending upon the construction of the rear fairing 66. The scope of the present invention is not limited solely to the construction illustrated, as would be appreciated by those skilled in the art.

The sealing members 102, 106 are preferably made of a flexible and deformable material such as rubber or foam. However, as would be appreciated by those skilled in the art, any alternative sealing material may be substituted therefor without deviating from the scope of the present invention. Additionally, while two sealing members 102, 106 are illustrated in FIG. 9, only one is required to discourage the ingress of snow, water, dirt, and debris into the interior of the storage compartment 78. Alternatively, it is contemplated that no sealing members may be needed to discourage the ingress of snow, water, dirt, and debris into the storage compartment 78 if the lower lip 108 of the upper portion 70 is designed to provide a convoluted path 110 into the storage compartment 78.

Figure 10:
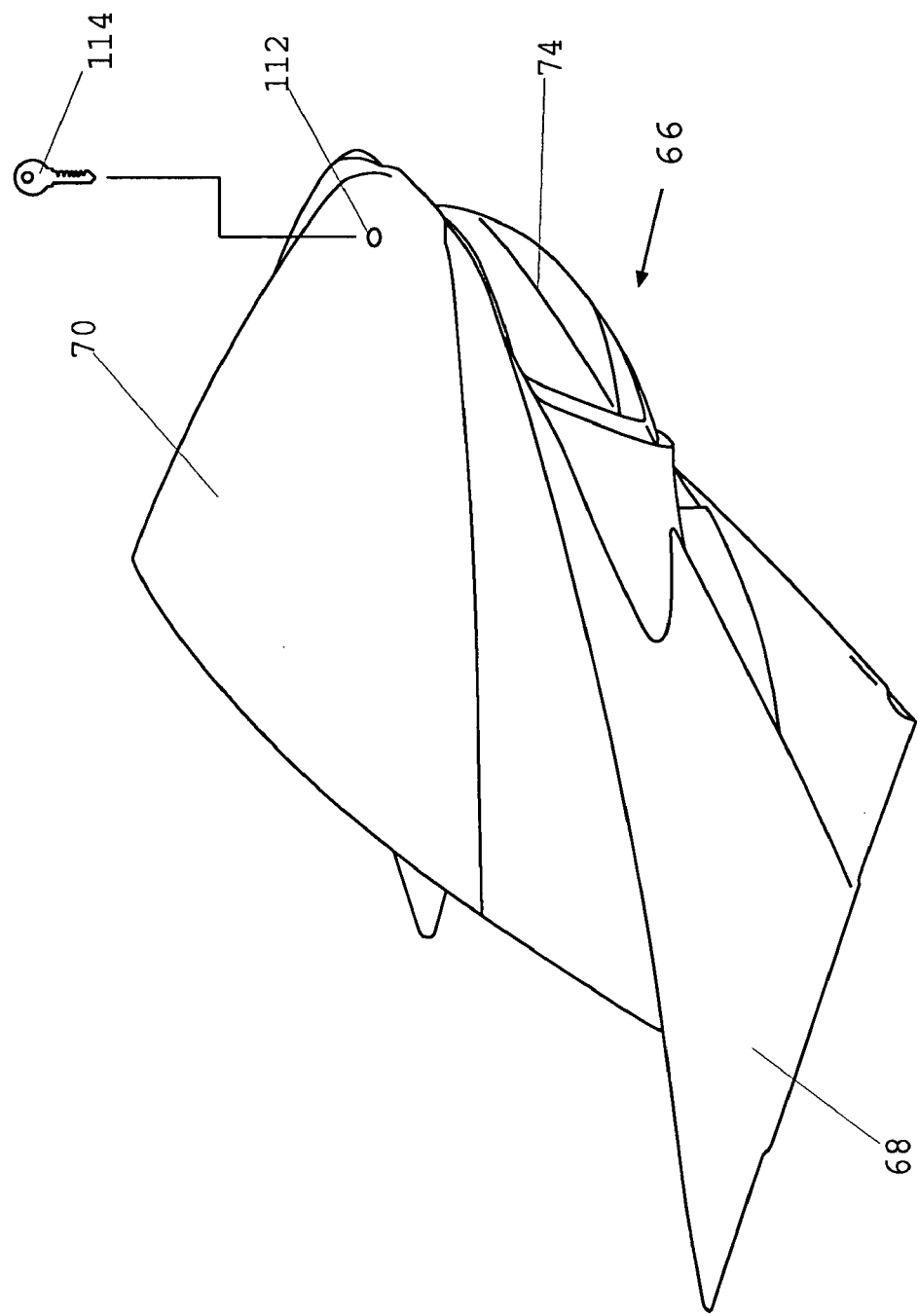
FIG. 10 is a perspective illustration of the rear fairing for the snowmobile illustrated in FIG. 3, showing one location for a lock between the upper and lower portions thereof.

FIG. 10 illustrates the rear fairing from a top perspective. This figure illustrates a further aspect of the present invention, the locking mechanism 112. Since the upper and lower portions 68, 70 of the rear fairing 66 are preferably composed of a rigid (or at least semi-rigid) material, it is contemplated that a locking mechanism may be provided between the lower and upper portions 68, 70 so that the storage compartment 78 may be locked to discourage theft of any contents therein. In the embodiment illustrated, the locking mechanism 112 is activated by a key 114. The locking mechanism 112, therefore, may be one of any conventional types of key-activated locking devices that are available commercially. It is contemplated, however, that the locking mechanism 112 could be a keyless entry system as well. This presents the advantage that the snowmobile rider need not carry a separate key 114 for the storage compartment 78 of the snowmobile 50. As would be appreciated by those skilled in the art, other locking devices may also be used. The scope of the present invention is not limited to any particular type of locking mechanism 112.

Since prior art snowmobiles 10 incorporate the storage compartment 26 into the seat 28, the design of the rear end 30 of the seat 28 is limited. In particular, as discussed above and as illustrated in FIGS. 1 and 2, the rear end 30 of the seat 28 in the conventional snowmobile 10 must be rounded so that the flap 32 may be fashioned from the covering material to provide access to the storage compartment 26. This constraint necessarily discourages the incorporation of aerodynamic shaping to the rear end 30 of the snowmobile 10.

Aerodynamic styling is preferred for two reasons. First, engineers prefer aerodynamic styling because it enhances the operation of the vehicle. Second, customers prefer aerodynamic styling for the same reason and also because it presents an attractive overall appearance for the vehicle.

Since the lower and upper portions 68, 70 of the rear fairing 66 of the present invention are preferably made of a rigid or semi-rigid material, aerodynamic styling may be incorporated, for the first time, into the design of a snowmobile 50.

Figure 11:
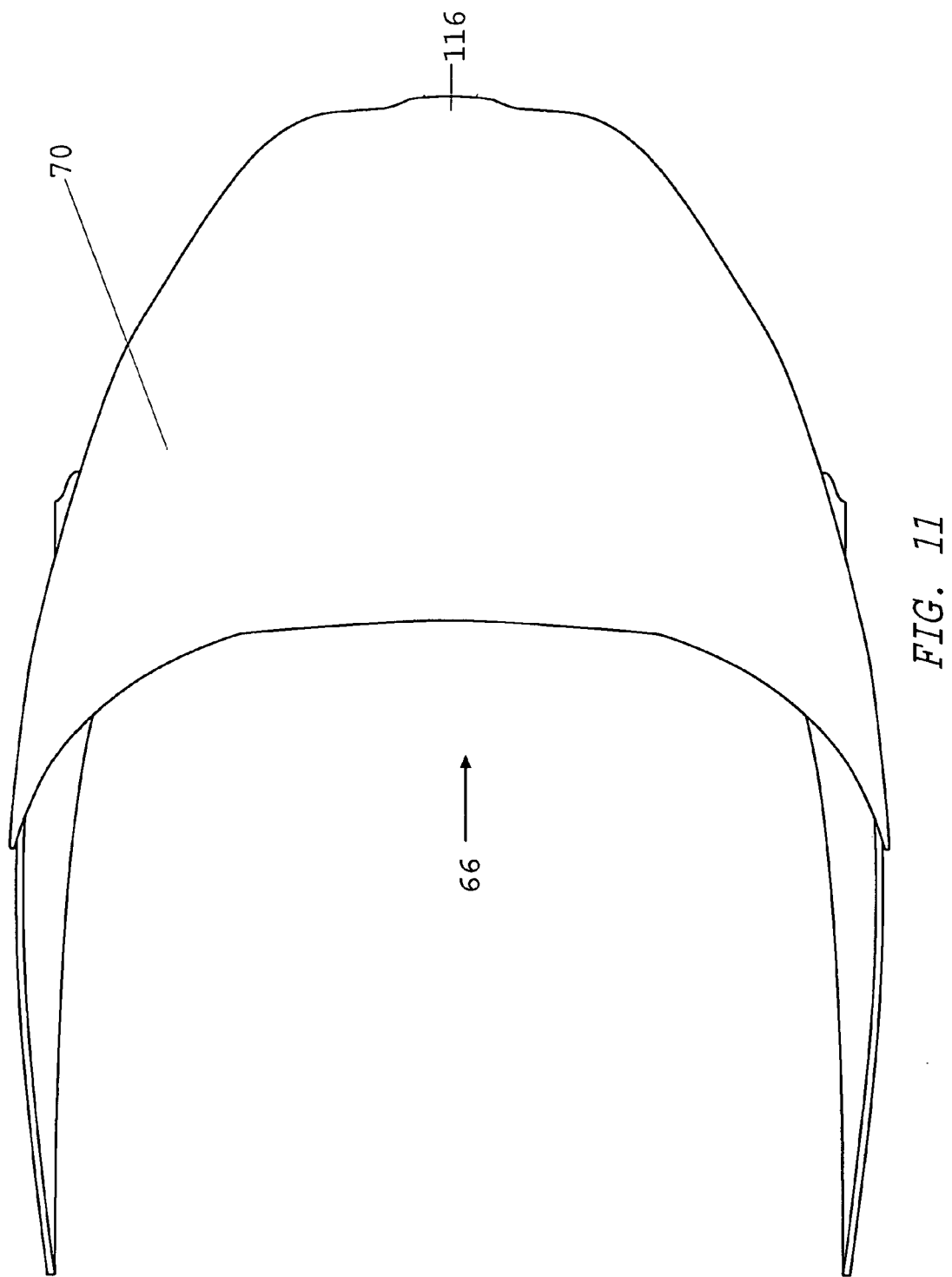
FIG. 11 is a top view of the rear fairing for the snowmobile illustrated in FIG. 3, showing the location of the tail light thereon.
Figure 12:
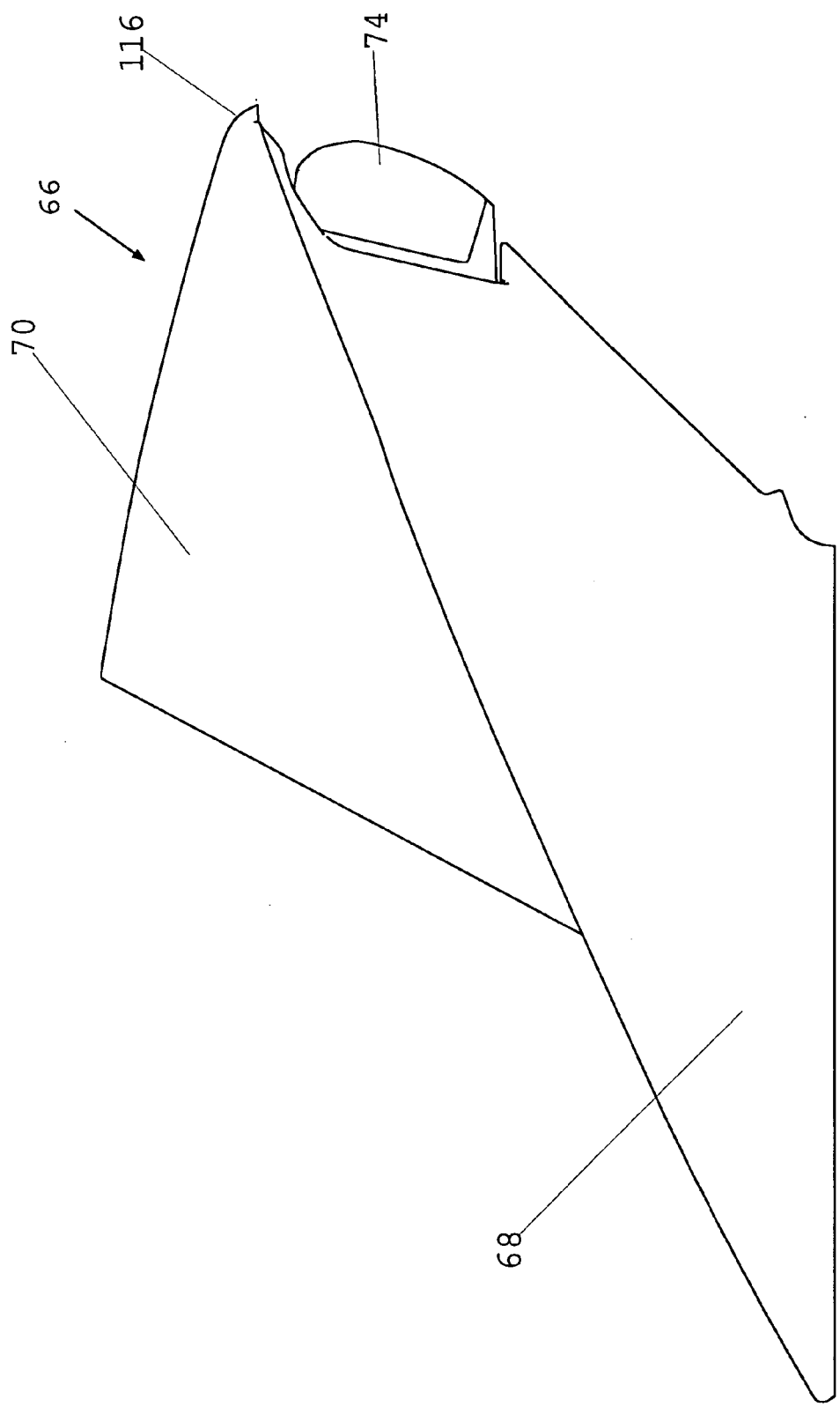
FIG. 12 is a side view of the rear fairing for the snowmobile illustrated in FIG. 3, illustrating a first embodiment of the aerodynamic shape thereof.
Figure 13:
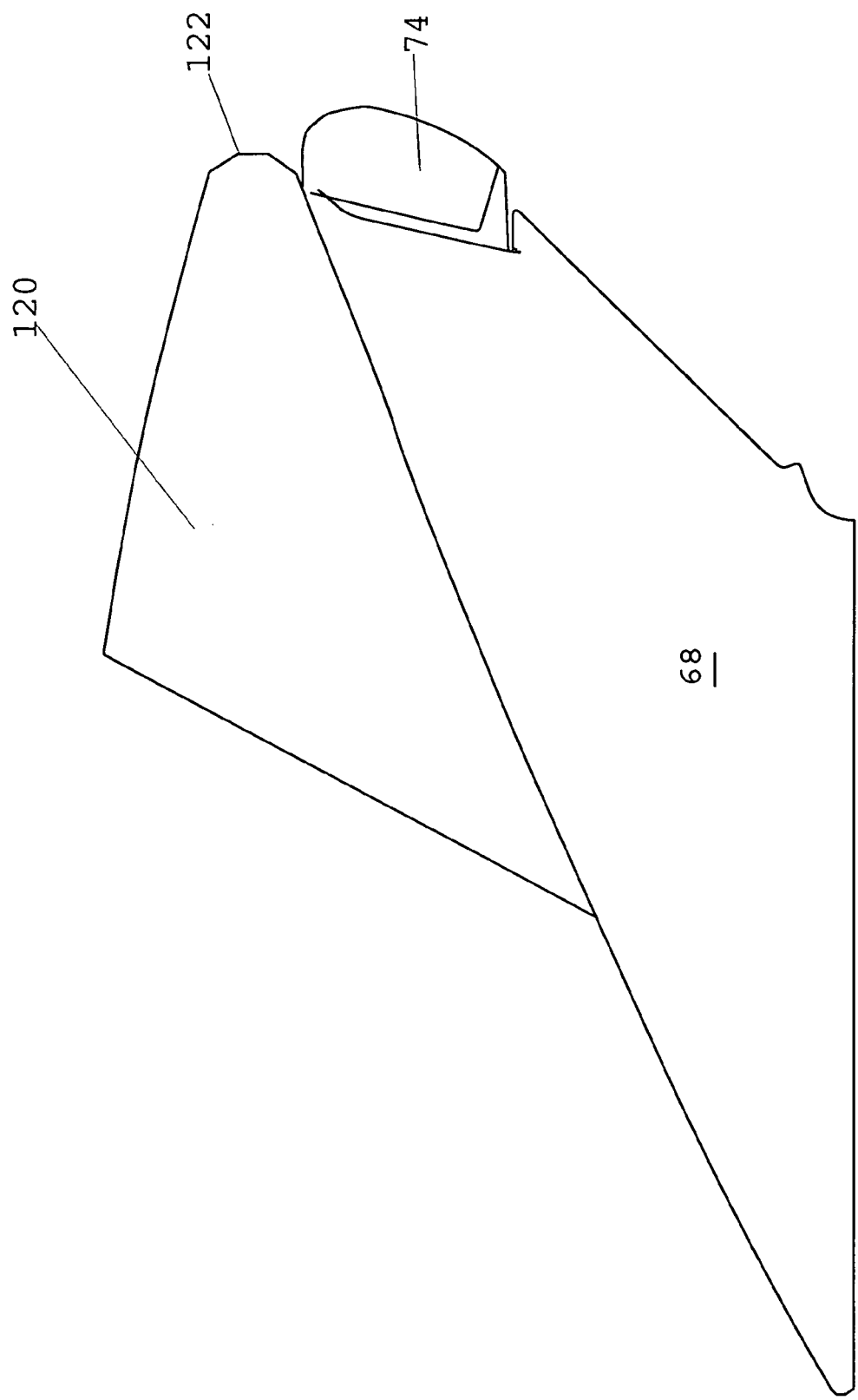
FIG. 13 is a side view of the rear fairing for the snowmobile illustrated in FIG. 3, illustrating a second embodiment of the aerodynamic shape thereof.

FIGS. 11–13 illustrate two embodiments of aerodynamic styling that are contemplated for the present invention. FIG. 11 shows a top view of the rear fairing 66, illustrating the bullet-shaped appearance of the top portion 70. In particular, the front end 116 of the rear fairing is wide and extends from the rear of the seat (not shown). The top portion tapers inwardly from the front to a rounded tip 116 at the rear end. As illustrated, the tail light 74 is positioned on an extension 118 that extends outwardly from the rear end of the lower portion 68. Since the top and bottom portions 68, 70 taper inwardly, as viewed from above, air drag on the rear of the vehicle may be minimized.

In addition, as illustrated in FIG. 12, which is a side view of the rear fairing shown in FIG. 11, the rear fairing 66 also tapers in a vertical direction to the rounded tip 116. In other words, the top portion 70 tapers downwardly from the front end the rear end and the bottom portion 68 tapers upwardly from front to rear. This aerodynamic construction also minimizes drag at the rear end of the snowmobile 50.

The rounded tip 116, however, is only one from a wide variety of designs contemplated for the rear of the snowmobile 50. FIG. 13 illustrates on possible variation where the rear end of the top portion 120 has a blunt end 122 rather than the rounded tip 116 illustrated in FIG. 11 and 12. This design also is considered to be aerodynamic and offers similar advantages to the design shown in FIGS. 11 and 12.

As would be appreciated by those skilled in the art, the actual aerodynamic design of the rear fairing 66 is not limited solely to the two designs presented. Other designs may be employed without departing from the scope of the present invention.

The description and drawings that are presented above are meant to be illustrative of the present invention. They are not meant to be limiting of the scope of the present invention. Modifications to the embodiments described may be made without departing from the present invention, the scope of which is defined, in part, by the following claims:

What is claimed is:

1. A snowmobile, comprising:
   a frame;
   two skis disposed at a forward end of the frame;
   an endless drive track disposed beneath a rearward end of the frame to propel the snowmobile;
   a seat mounted on the frame adapted to accommodate at least one person;
   a fairing disposed rearwardly of the seat, the fairing having an upwardly and rearwardly inclined rear end face; and
   a storage compartment defined by an interior of the fairing.

2. A snowmobile as claimed in claim 1, wherein the fairing further comprises an upper portion and a lower portion, the upper portion being pivotally connected to the lower portion.

3. A snowmobile as claimed in claim 2, wherein at least one of the upper portion and the lower portion comprises a material different from that of the seat.

4. A snowmobile as claimed in claim 3, wherein the upper portion comprises a more rigid material than that of the seat.

5. A snowmobile as claimed in claim 2, wherein the upper portion and the lower portion mate with one another in a closed position and do not mate with one another in an opened position, and wherein the upper portion pivots to a predetermined angle of up to 150 degrees when in the opened position.

6. A snowmobile as claimed in claim 5, wherein the upper portion and the lower portion mate with one another in a closed position and do not mate with one another in an opened position, and wherein, when in the closed position, the upper portion mates with the lower portion at a junction wherein the junction includes a seal disposed on one of the upper portion and the lower portion.

7. A snowmobile as claimed in claim 2, wherein the lower portion comprises a tail light.

8. A snowmobile as claimed in claim 1, wherein the fairing includes a lock.

9. A snowmobile comprising:
   a frame;
   two skis disposed at a forward end of the frame;
   an endless drive track disposed beneath a rearward end of the frame to propel the snowmobile;
   a seat mounted on the frame adapted to accommodate at least one person, the seat having a rear end;
   a fairing positioned rearwardly of the seat, wherein the fairing includes an upper portion and a lower portion, the fairing having an upwardly and rearwardly inclined rear end face; and
   a storage compartment formed by a portion of the rear end of the seat, the upper portion of the fairing and the lower portion of the fairing.

10. A snowmobile as claimed in claim 9, wherein the fairing tapers inwardly toward a rear end of the.

11. A snowmobile as claimed in claim 9, wherein a rearward end of the fairing has a pointed shape.

12. A snowmobile as claimed in claim 9, wherein a rearward end of the fairing has a blunt shape.

13. A snowmobile as claimed in claim 9, wherein the fairing extends a predetermined distance beyond the rearward end of the frame.

14. A snowmobile, comprising:
   a frame;
   two skis disposed at a forward end of the frame;

an endless drive track disposed beneath a rearward end of the frame to propel the snowmobile;

a seat mounted on the frame adapted to accommodate at least one person, the seat comprising a foam covered by a flexible material;

a plastic fairing disposed rearwardly of the seat, the fairing comprising an upper portion and a lower portion, a storage compartment formed between the upper portion and the lower portion, the upper portion being pivotally connected to the lower portion so as to provide access the storage compartment; and a tail light disposed on a rear end of the lower portion of the fairing.

15. A snowmobile comprising:

a frame;

two skis disposed at a forward end of the frame;

an engine disposed on the frame;

an endless drive track disposed beneath a rearward end of the frame tunnel and operatively connected to the engine to propel the snowmobile;

two skis mounted to the frame, each via a front suspension;

a straddle seat disposed on the frame above the drive track and rearward of the engine, the seat having an upwardly and rearwardly inclined rear end face; and a fairing disposed rearward of the seat, the fairing having an upwardly and rearwardly inclined face opposing the rear end face of the seat.

16. The snowmobile of claim 15, wherein the fairing further includes a rear end face, the rear end face having a least a portion which is upwardly inclined.

17. The snowmobile of claim 16, wherein the fairing further includes a tail light disposed in the upwardly inclined rear end face.

18. The snowmobile of claim 15, wherein a storage compartment is formed between the seat and the fairing.

* * * * *